United States Patent
Hata et al.

(10) Patent No.: US 9,903,775 B2
(45) Date of Patent: Feb. 27, 2018

(54) SENSOR MODULE AND METHOD FOR PRODUCING SENSOR MODULE

(71) Applicant: NAGANO KEIKI CO., LTD., Tokyo (JP)

(72) Inventors: Yukihiko Hata, Tokyo (JP); Kaori Miyashita, Tokyo (JP); Eiji Takeda, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 135 days.

(21) Appl. No.: 14/978,592

(22) Filed: Dec. 22, 2015

(65) Prior Publication Data

US 2016/0187216 A1    Jun. 30, 2016

(30) Foreign Application Priority Data

Dec. 26, 2014    (JP) .................................. 2014-264220

(51) Int. Cl.
*G01L 9/00* (2006.01)

(52) U.S. Cl.
CPC .................................. *G01L 9/0051* (2013.01)

(58) Field of Classification Search
CPC .................................................. G01L 9/0051
USPC ......................................................... 73/720
See application file for complete search history.

(56) References Cited

U.S. PATENT DOCUMENTS

| | | | | |
|---|---|---|---|---|
| 2003/0061884 | A1* | 4/2003 | Miodushevsky | ..... G01L 1/2243 73/795 |
| 2005/0193836 | A1* | 9/2005 | Yoshida | ................ G01L 9/0051 73/862.628 |

FOREIGN PATENT DOCUMENTS

| | | |
|---|---|---|
| EP | 1571434 A2 | 9/2005 |
| JP | 63-228764 | 9/1988 |
| JP | 4452526 | 2/2010 |

OTHER PUBLICATIONS

European Search Report dated May 19, 2016, 8 pages.

\* cited by examiner

*Primary Examiner* — Manish S Shah
*Assistant Examiner* — Jean Morello
(74) *Attorney, Agent, or Firm* — Rankin, Hill & Clark LLP

(57) ABSTRACT

A detector provided on a flat portion of a diaphragm includes a plurality of strain gauges, resistor element connectors connecting adjacent ones of the strain gauges, and an electric conductor covering a part of the resistor element connectors. First linear portions and second linear portions of the resistor element connectors exposed from the electric conductor are orthogonal to the edges of the electric conductor extending across the first linear portions and the second linear portions. Even when a pattern of the resistor element connector and a pattern of electric conductor are misaligned in X direction or in Y direction, an area of the resistor element connector exposed from the electric conductor does not change.

6 Claims, 8 Drawing Sheets

SENSOR MODULE AND METHOD FOR PRODUCING SENSOR MODULE

The entire disclosure of Japanese Patent Application No. 2014-264220 filed Dec. 26, 2014 is expressly incorporated by reference herein.

TECHNICAL FIELD

The present invention relates to a sensor module and a method for producing the sensor module.

BACKGROUND ART

Some of the sensor modules of pressure sensors include a diaphragm, four strain gauges for detecting a strain, and resistor element connectors and electrodes connected to the strain gauges, the strain gauges, the resistor element connectors and the electrodes being provided on the diaphragm, where a part of each of the resistor element connectors and the electrodes are covered with an electric conductor.

The electric conductor serves as a connector for the resistor element electrode, terminal(s) and the like and has a predetermined wiring pattern.

In a typical thin-film pressure sensor, a silicon oxide layer, polysilicon layer and aluminum layer are deposited on a surface of a diaphragm, an aluminum-layer pattern is formed by a photolithography etching, and the aluminum-layer pattern and the polysilicon layer are selectively removed by an etching to provide a pressure-sensitive-layer pattern and an electrode-wiring pattern (Patent Literature 1: JP-A-S63-228764).

In another typical example (strain detection element), a thin-film resistor is formed on an insulation film of a straining portion using vapor-deposit, sputtering and the like and an electrode thin film is formed on the thin-film resistor using vapor-deposit, sputtering and the like (Patent Literature 2: JP-B-4452526).

In Patent Literatures 1 and 2, the pattern of the resistor element and conductor is formed using vapor-deposit and the like. However, when the pattern of the resistor element and the pattern of the conductor are misaligned with each other, the areas of the plurality of resistor elements exceed or fall short of a designed value.

When the areas of the resistor elements exceed or fall short of the designed value, the resistance of the resistor elements become different from a desired value, resulting in variation in the output of the resistor elements. The variation of the output of the resistor elements is unfavorable and thus an output adjustment of the resistor elements is required. However, the output adjustment requires complicated processes.

The problem associated with the typical examples will be described below with reference to schematic illustrations shown in FIGS. 8A to 8C.

FIG. 8A shows a detector 200A assumable based on Patent Literatures 1 and 2.

The detector 200A is provided on a flat portion of a diaphragm (not shown). The detector 200A includes four strain gauges 700.

The strain gauge 700 includes two central strain gauges 710, 720 and two outer strain gauges 730, 740. A resistor element connector 800 (a first resistor element connector 810, a second resistor element connector 820, a third resistor element connector 830 and a fourth resistor element connector 840) is connected to the strain gauge 700.

The first electrode 910 is connected to the first resistor element connector 810. The second electrode 920 is connected to second resistor element connector 820. The third electrode 930 is connected to the third resistor element connector 830. The fourth electrode 940 is connected to the fourth resistor element connector 840.

A part of the first resistor element connector 810 and the first electrode 910 are covered with a first electric conductor 1100. A part of the second resistor element connector 820 and the second electrode 920 are covered with a second electric conductor 1200. A part of the third resistor element connector 830 and the third electrode 930 are covered with the third electric conductor 1300. A part of the fourth resistor element connector 840 and the fourth electrode 940 are covered with a fourth electric conductor 1400.

The first electric conductor 1100 to the fourth electric conductor 1400 define an electric conductor 1000. Regions S1 to S4 are defined by a part of the strain gauge 700 and the resistor element connector 800 not covered with the electric conductor 1000.

When the electric conductor 1000 of the above detector 200A is vertically shifted with respect to the strain gauge 700 and the resistor element connector 800 as shown in FIG. 8B, or when the electric conductor 1000 of the above detector 200A is horizontally shifted with respect to the strain gauge 700 and the resistor element connector 800 as shown in FIG. 8C, the area of the regions S1 to S4 in FIG. 8B or 8C becomes different from the area of the regions S1 to S4 shown in FIG. 8A. Consequently, the outputs of the plurality of strain gauges varies.

SUMMARY OF THE INVENTION

An object of the invention is to provide a sensor module with small variations in outputs of a plurality of strain gauges and capable of easily performing an output adjustment, and a method for producing the sensor module.

A sensor module according to an aspect of the invention includes: a diaphragm; and a detector provided to a flat portion of the diaphragm to detect a pressure, in which the detector comprises a plurality of strain gauges each configured to detect a strain, a resistor element connector connecting adjacent ones of the strain gauges, and an electric conductor covering a part of the resistor element connector, and the resistor element connector comprises a linear portion partially exposed from the electric conductor, the linear portion extending in a first direction orthogonal to an edge of the electric conductor extending across the linear portion.

In the above aspect of the invention, the strain gauge and the resistor element connector are formed on the diaphragm using vapor-deposit and the like, and the electric conductor is formed to cover a part of the resistor element connector using CVD, sputtering and the like. When the electric conductor is formed, the pattern of the electric conductor may be misaligned with respect to the pattern of the resistor element connector in an orthogonal direction.

Since the electric conductor is arranged so that the linear portion of the resistor element connector exposed from the electric conductor is orthogonal to the edge of the electric conductor extending across the linear portion, even when the pattern is misaligned in the orthogonal direction with respect to the resistor element connector, the sum of the area of the strain gauge and the area of the part of the resistor element connector exposed from the electric conductor does not change, thereby keeping the resistances of the plurality of strain gauges from being changed. Accordingly, variation in the outputs of the plurality of strain gauges can be reduced, thereby facilitating the output adjustment.

In the sensor module of the above aspect of the invention, it is preferable that the resistor element connector comprises at least a first resistor element connector and a second resistor element connector, the first and second resistor element connectors being respectively connected to each of ends of the strain gauges, and the edge of the electric conductor extending across the linear portion of the first resistor element connector exposed from the electric conductor is in parallel with the edge of the electric conductor extending across the linear portion of the second resistor element connector exposed from the electric conductor.

According to the above arrangement, even when the pattern of the electric conductor may be misaligned in parallel to the linear portion in forming the electric conductor. Even when one of the resistor element connectors connected to both ends of the strain gauge becomes smaller than a designed value, the area of the other of the resistor element connectors becomes larger than the designed value, thereby compensating the increase and decrease in the areas. Accordingly, since the areas of the strain gauge and the resistor element connector stays the same irrespective of the pattern misalignment with the pattern of the electric conductor, the resistances of the plurality of strain gauges do not change. Consequently, the variation in the outputs of the plurality of strain gauges can be further reduced.

In the sensor module of the above aspect of the invention, it is preferable that the strain gauge includes at least two central strain gauges disposed at a center of the diaphragm and at least two outer strain gauges disposed at an outer side of the diaphragm, the resistor element connector comprises at least two resistor element connectors each connected to each of ends of the central strain gauges, and the linear portions of the resistor element connectors are mutually in parallel and the edges of the electric conductor each extending across the linear portions of each of the resistor element connectors are mutually in parallel.

According to the above arrangement, in each of the at least two central strain gauge provided at the center of the diaphragm, the edges of the electric conductors respectively provided on both sides are in parallel with each other. Accordingly, the above effect can be obtained in the central strain gauge.

In the sensor module of the above aspect of the invention, it is preferable that the strain gauge and the resistor element connector are made of the same material.

According to the above arrangement, since the strain gauge and the resistor element connector can be provided on the diaphragm in the same process, the production process can be simplified.

In the sensor module of the above aspect of the invention, it is preferable that the diaphragm is provided at an end of a cylindrical portion, and a to-be-measured fluid is configured to be introduced into an interior of the cylindrical portion.

According to the above arrangement, the above effect can be achieved in the sensor module suitable for a pressure measurement.

A method according to another aspect of the invention is for producing a sensor module, the method including: forming a pattern of the strain gauge and the resistor element connector on the diaphragm; and layering a conductive material on a part of the linear portion of the resistor element connector to form the detector.

According to the above aspect of the invention, the above-described effects can be obtained.

BRIEF DESCRIPTION OF DRAWING(S)

DESCRIPTION OF EMBODIMENT(S)

First Exemplary Embodiment

FIGS. 1 to 3C show a first exemplary embodiment of the invention.

Figure 1:
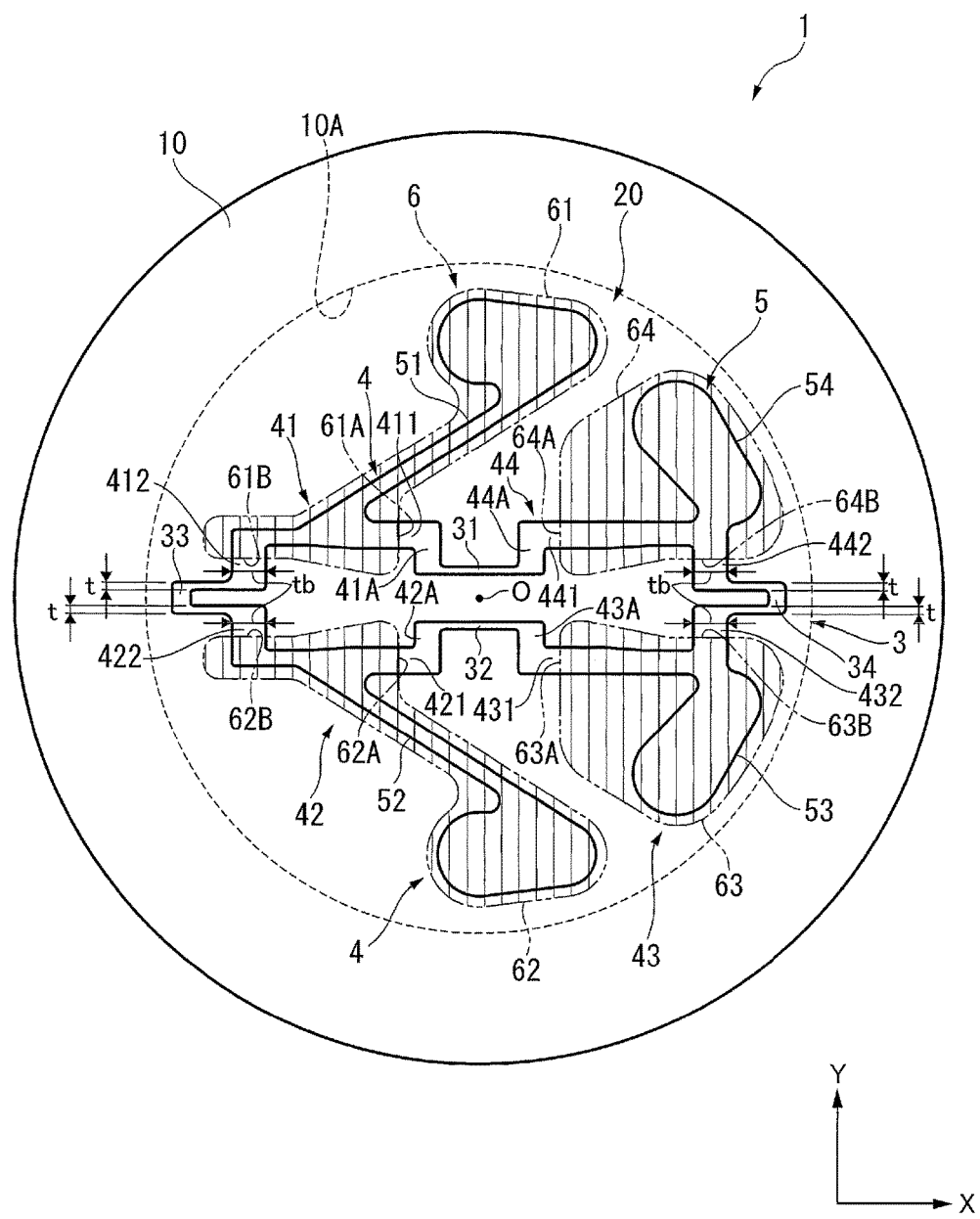
FIG. 1 is a plan view showing a sensor module according to a first exemplary embodiment of the invention.

FIG. 1 shows an entire arrangement of a sensor module 1 in a plan view.

As shown in FIG. 1, the sensor module 1 includes a circular (in the plan view) diaphragm 10, and a detector 20 provided on a flat portion of the diaphragm 10 to detect a pressure.

The sensor module 1 of the exemplary embodiment is a pressure sensor device, in which the diaphragm 10 is displaced by a pressure of a to-be-measured fluid and the displacement of the diaphragm 10 is detected by the detector 20.

The diaphragm 10 is provided at an end of a cylindrical portion 10A. A recess, into which a to-be-measured fluid is introduced, is provided inside the cylindrical portion 10A. The diaphragm 10 and the cylindrical portion 10A are integrally provided using a metal material and the like. An insulation film (not shown) is provided on the flat portion of the diaphragm 10. The detector 20 is provided on the surface of the insulation film. A protection film (not shown) in a form of a silicon oxide film or a silicon nitride film is provided on the detector 20.

The detector 20 includes a strain gauge 3 for detecting a strain, a resistor element connector 4 connected with the strain gauge 3, an electrode 5 connected with the resistor element connector 4, and an electric conductor 6 covering a part of the resistor element connector 4 and the electrode 5.

The electric current detected by the strain gauge 3 in accordance with a displacement of the diaphragm 10 is transmitted to an outside via the resistor element connector 4, the electrode 5 and the electric conductor 6.

The strain gauge 3, the resistor element connector 4 and the electrode 5 are made of the same material (e.g. polysilicon).

The strain gauge 3 includes two central strain gauges 31, 32 disposed at the center of the diaphragm 10, and two outer strain gauges 33, 34 disposed at an outer side of the diaphragm 10.

The two central strain gauges 31, 32 are linearly formed in an X direction in FIG. 1.

The two central strain gauges 31, 32 are mutually closely disposed in parallel across a circle center O of the diaphragm 10.

The two outer strain gauges 33, 34 are provided in a C-shape (in a plan view). The two outer strain gauges 33, 34 include a pair of connection portions extending in the X direction in FIG. 1, the pair of connection portions having open ends.

The resistor element connector 4 includes a first resistor element connector 41, a second resistor element connector 42, a third resistor element connector 43 and a fourth resistor element connector 44.

The first resistor element connector 41 includes an end 41A connected to a first end of the central strain gauge 31, a first linear portion 411 connected to the end 41A, and a second linear portion 412 connected to the first linear portion 411. The second linear portion 412 is also connected to a first end of the outer strain gauge 33.

The end 41A extends in a direction away from the second resistor element connector 42.

The first linear portion 411 extends in parallel to the central strain gauges 31, 32.

The second linear portion 412 is bent at a right angle with respect to the first linear portion 411.

A connection portion between the second linear portion 412 and the outer strain gauge 33 is bent at a right angle. In other words, the first linear portion 411 extends along the X direction, and the end 41A and the second linear portion 412 extend along the Y direction.

The second resistor element connector 42 includes an end 42A connected to a first end of the central strain gauge 32, a first linear portion 421 connected to the end 42A, and a second linear portion 422 connected to the first linear portion 421. The second linear portion 422 is also connected to a second end of the outer strain gauge 33.

The end 42A extends collinearly with the end 41A in a direction away from the end 41A.

The first linear portion 421 extends in parallel to the first linear portion 411 and has the same width as the first linear portion 411.

The second linear portion 422 is bent at a right angle with respect to the first linear portion 421.

A connection portion between the second linear portion 422 and the outer strain gauge 33 is bent at a right angle. In other words, the first linear portion 421 extends along the X direction, and the end 42A and the second linear portion 422 extend along the Y direction.

The third resistor element connector 43 includes an end 43A connected to a second end of the central strain gauge 32, a first linear portion 431 connected to the end 43A, and a second linear portion 432 connected to the first linear portion 431. The second linear portion 432 is also connected to a first end of the outer strain gauge 34.

The end 43A extends in a direction away from the fourth resistor element connector 44.

The first linear portion 431 extends collinearly with the first linear portion 421 and has the same width as the first linear portion 421.

The second linear portion 432 is bent at a right angle with respect to the first linear portion 431.

In other words, the first linear portion 431 extends along the X direction, and the end 43A and the second linear portion 432 extend along the Y direction.

The fourth resistor element connector 44 includes an end 44A connected to a second end of the central strain gauge 31, a first linear portion 441 connected to the end 44A, and a second linear portion 442 connected to the first linear portion 441. The second linear portion 442 is also connected to a second end of the outer strain gauge 34.

The end 44A extends collinearly with the end 43A in a direction away from the end 43A.

The first linear portion 441 extends collinearly with the first linear portion 411 and has the same width as the first linear portion 411.

The second linear portion 442 is bent at a right angle with respect to the first linear portion 441.

In other words, the first linear portion 441 extends along the X direction, and the end 44A and the second linear portion 442 extend along the Y direction.

The electrode 5 includes a first electrode 51, a second electrode 52, a third electrode 53 and a fourth electrode 54.

The first electrode 51 is a linear member having a first end connected to the first linear portion 411. A space for defining a pad is formed at a second end of the first electrode 51.

The second electrode 52 is a linear member having a first end connected to the first linear portion 421. A space for defining a pad is formed at a second end of the second electrode 52.

The third electrode 53 is a linear member having a first end connected to the first linear portion 431. A space for defining a pad is formed at a second end of the third electrode 53.

The fourth electrode 54 is a linear member having a first end connected to the first linear portion 441. A space for defining a pad is formed at a second end of the fourth electrode 54.

The electric conductor 6 is made of a conductive material such as gold. The electric conductor 6 includes a first electric conductor 61, a second electric conductor 62, a third electric conductor 63 and a fourth electric conductor 64.

The first electric conductor 61 covers a part of the first linear portion 411, a part of the second linear portion 412 and the first electrode 51.

The second electric conductor 62 covers a part of the first linear portion 421, a part of the second linear portion 422 and the second electrode 52.

The third electric conductor 63 covers a part of the first linear portion 431, a part of the second linear portion 432 and the third electrode 53.

The fourth electric conductor 64 covers a part of the first linear portion 441, a part of the second linear portion 442 and the fourth electrode 54.

It should be noted that a plurality of vertical lines are shown in the electric conductor 6 in FIG. 1 to highlight the region of the electric conductor 6.

Figure 2:
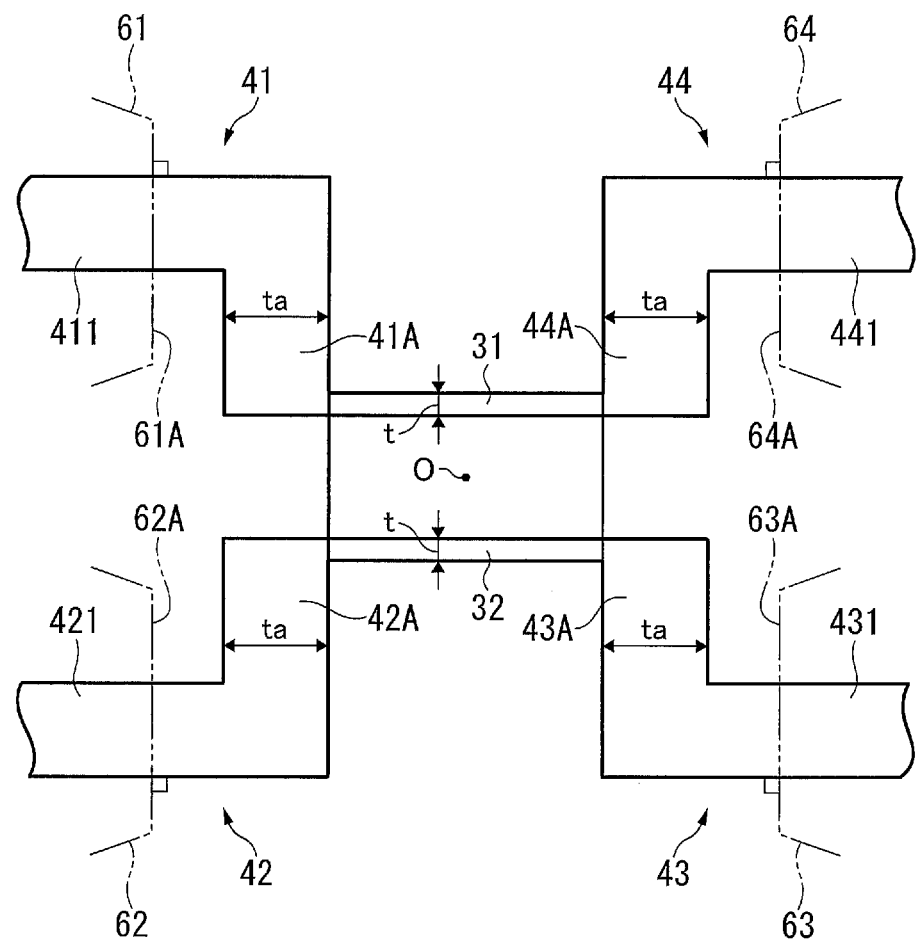
FIG. 2 is a plan view showing a central strain gauge and a vicinity thereof.

FIG. 2 shows the central strain gauges 31, 32 and a vicinity thereof.

As shown in FIG. 2, a part of the first linear portion 411 of the first resistor element connector 41 is exposed from the first electric conductor 61 so that the exposed part extending in the X direction is orthogonal to an edge 61A of the first electric conductor 61, the edge 61A extending across the first linear portion 411.

A part of the first linear portion 421 of the second resistor element connector 42 is exposed from the second electric conductor 62 so that the exposed part extending in the X direction is orthogonal to an edge 62A of the second electric conductor 62, the edge 62A extending across the first linear portion 421. The edge 61A is collinearly positioned with the edge 62A.

A part of the first linear portion 431 of the third resistor element connector 43 is exposed from the third electric conductor 63 so that the exposed part extending in the X direction is orthogonal to an edge 63A of the third electric conductor 63, the edge 63A extending across the first linear portion 431. The edge 62A is in parallel with the edge 63A.

A part of the first linear portion 441 of the fourth resistor element connector 44 is exposed from the fourth electric conductor 64 so that the exposed part extending in the X direction is orthogonal to an edge 64A of the fourth electric conductor 64, the edge 64A extending across the first linear portion 441. The edge 63A is collinearly positioned with the edge 64A. The edge 64A is in parallel with the edge 61A.

Dimensions (i.e. widths) of the central strain gauge 31, 32 in a direction (Y direction) orthogonal to a longitudinal direction thereof are each t.

Dimensions (i.e. widths) of the ends 41A, 42A, 43A, 44A in a direction (X direction) along the longitudinal direction of the central strain gauges 31, 32 are each ta.

The electric current detected by the central strain gauges 31, 32 is sent to an outside via the ends 41A, 42A, 43A, 44A, the first linear portions 411, 421, 431, 441, the electrode 5 and the electric conductor 6. The width ta of the ends 41A, 42A, 43A, 44A is a dimension in a direction orthogonal to the direction in which the electric current flows.

Referring back to FIG. 1, dimensions (i.e. widths) of the parts of the outer strain gauges 33, 34 connected to the second linear portions 412, 422, 432, 442 in a direction (Y direction) orthogonal to a longitudinal direction of the outer strain gauges 33, 34 are each t.

Dimensions (i.e. widths) of the second linear portions 412, 422, 432, 442 in a direction (X direction) along the longitudinal direction of the outer strain gauges 33, 34 are each tb.

The electric current detected by the outer strain gauges 33, 34 is sent to the outside via the second linear portions 412, 422, 432, 442, the first linear portions 411, 421, 431, 441, the electrode 5 and the electric conductor 6. The width tb of the second linear portions 412, 422, 432, 442 is a dimension in a direction orthogonal to the direction in which the electric current flows.

In the present exemplary embodiment, a ratio (ta/t) of the width ta of the ends 41A, 42A, 43A, 44A relative to the width t of the central strain gauge 31, 32 is less than 5. A ratio (tb/t) of the width tb of the second linear portions 412, 422, 432, 442 relative to the width t of the outer strain gauge 33, 34 is less than 5.

Specifically, with the diaphragm 10 of a 5 mm diameter, when the widths t of the central strain gauges 31, 32 and the outer strain gauge 33, 34 are 40 μm, the widths ta of the ends 41A, 42A, 43A, 44A are 120 μm, and the widths tb of the second linear portions 412, 422, 432, 442 are 160 μm, ta/t=3 and tb/t=4. On the other hand, in a typical pressure sensor device having a 5 mm diameter and provided with the pattern disclosed in Patent Literature 2, the width of the strain gauge is 40 μm and the width of the resistor element connector connected with the strain gauge is 200 μm. Thus, the ratio of the widths is 5.

Next, a method for producing the sensor module according to the first exemplary embodiment will be described with reference to FIGS. 3A to 3C.

Figure 3A:
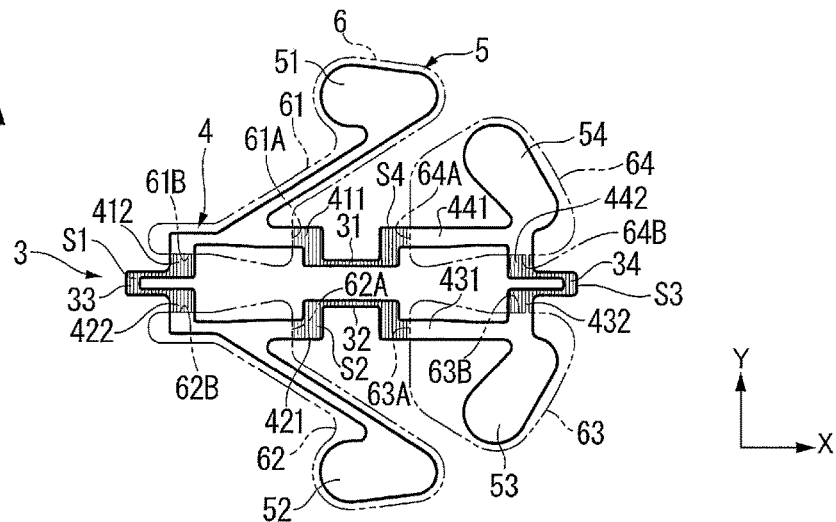
FIG. 3A is a schematic illustration showing a method for producing the sensor module according to the first exemplary embodiment.

As shown in FIG. 3A, the pattern of the strain gauge 3, the resistor element connector 4 and the electrode 5 is formed on the diaphragm using CVD, sputtering and the like. Subsequently, as shown by imaginary lines, the electric conductor 6 covering the parts of the first linear portions 411, 421, 431, 441 and the parts of the second linear portions 412, 422, 432, 442 of the resistor element connector 4, and the electrode 5 is formed using vapor-deposit and the like. In the vapor-deposit of the electric conductor 6, a conductive material is layered on the strain gauge 3, the resistor element connector 4 and the electrode 5. The vapor-deposit is performed on the diaphragm along the X direction or the Y direction. A protection layer is formed on the thus provided detector 20. It should be noted that FIG. 3A shows the electric conductor 6 provided at originally intended (correct) position.

Among the exposed regions of the strain gauge 3, the resistor element connector 4 and the electrode 5, a region exposed between the first electric conductor 61 and the second electric conductor 62 is defined as S1, a region exposed between the second electric conductor 62 and the third electric conductor 63 is defined as S2, a region exposed between the third electric conductor 63 and the fourth electric conductor 64 is defined as S3, and a region exposed between the fourth electric conductor 64 and the first electric conductor 61 is defined as S4.

Figure 3B:
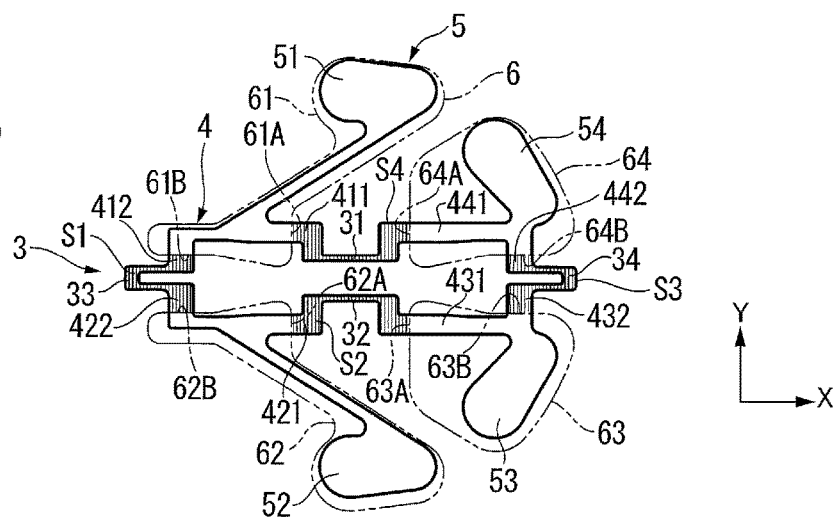
FIG. 3B is another schematic illustration showing the method for producing the sensor module according to the first exemplary embodiment.
Figure 3C:
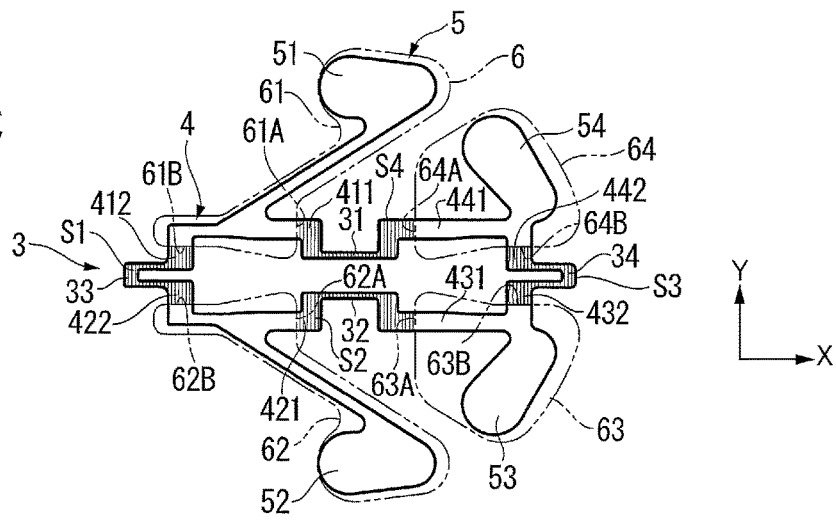
FIG. 3C is still another schematic illustration showing the method for producing the sensor module according to the first exemplary embodiment.

When the electric conductor 6 is formed, the pattern of the strain gauge 3, the resistor element connector 4 and the electrode 5 may sometimes be misaligned with respect to the pattern of the electric conductor 6 in the Y direction (as shown in FIG. 3B) or in the X direction (as shown in FIG. 3C).

It is supposed that, as shown in FIG. 3B, the pattern of the strain gauge 3, the resistor element connector 4 and the electrode 5 is misaligned with respect to the pattern of the electric conductor 6 in the Y direction (in other words, the electric conductor 6 is misaligned downward with respect to that in FIG. 3A in which the electric conductor 6 is provided at the correct position).

Then, though a part of the second linear portion 412 of the first resistor element connector 41 exposed from the first electric conductor 61 is shortened by the dimension corresponding to the misalignment, a part of the second linear portion 422 of the second resistor element connector 42 exposed from the second electric conductor 62 is lengthened by the dimension corresponding to the misalignment. Since the width of the second linear portion 412 and the width of the second linear portion 422 are the same (i.e. tb), the sum of the areas of the second linear portions 412, 422 does not change in spite of the misalignment.

Similarly, though a part of the second linear portion 442 of the fourth resistor element connector 44 exposed from the fourth electric conductor 64 is shortened by the dimension corresponding to the misalignment, a part of the second linear portion 432 of the third resistor element connector 43 exposed from the third electric conductor 63 is lengthened by the dimension corresponding to the misalignment.

Since the width of the second linear portion 442 and the width of the second linear portion 432 are the same (i.e. tb), the sum of the areas of the second linear portions 432, 442 does not change in spite of the misalignment.

On the other hand, the edge 61A of the first electric conductor 61 extending across the first linear portion 411 is a linear line extending along the Y direction, the edge 62A of the second electric conductor 62 extending across the first linear portion 421 is a linear line extending along the Y direction, the edge 63A of the third electric conductor 63 extending across the first linear portion 431 is a linear line extending along the Y direction, and the edge 64A of the fourth electric conductor 64 extending across the first linear portion 441 is a linear line extending along the Y direction.

Accordingly, even when the pattern of the strain gauge 3, the resistor element connector 4 and the electrode 5 is misaligned with respect to the pattern of the electric conductor 6 in the Y direction, the areas of the first linear portions 411, 421, 431 and 441 and the areas of the ends 41A, 42A, 43A and 44A stay the same.

Alternatively, it is supposed that, as shown in FIG. 3C, the pattern of the strain gauge 3, the resistor element connector 4 and the electrode 5 is misaligned with the pattern of the electric conductor 6 in X direction (in other words, the electric conductor 6 is shifted rightward with respect to that in FIG. 3A in which the electric conductor 6 is provided at the correct position).

Then, though a part of the first linear portion 411 exposed from the first electric conductor 61 is shortened by the dimension corresponding to the misalignment, a part of the first linear portion 441 exposed from the fourth electric conductor 64 is lengthened by the dimension corresponding to the misalignment. Since the width of the first linear portion 411 and the width of the first linear portion 441 are the same, the sum of the areas of the first linear portions 411, 441 does not change in spite of the misalignment.

Similarly, though a part of the first linear portion 421 exposed from the second electric conductor 62 is shortened by the dimension corresponding to the misalignment, a part of the first linear portion 431 exposed from the third electric conductor 63 is lengthened by the dimension corresponding to the misalignment. Since the width of the first linear portion 431 and the width of the second linear portion 432 are the same, the sum of the areas of the first linear portions 421, 431 does not change in spite of the misalignment.

On the other hand, the edge 61B of the first electric conductor 61 extending across the second linear portion 412 is a linear line extending along the X direction, the edge 62B of the second electric conductor 62 extending across the second linear portion 422 is a linear line extending along the X direction, the edge 63B of the third electric conductor 63 extending across the second linear portion 432 is a linear line extending along the X direction, and the edge 64B of the fourth electric conductor 64 extending across the second linear portion 442 is a linear line extending along the X direction.

Accordingly, even when the pattern of the strain gauge 3, the resistor element connector 4 and the electrode 5 is misaligned with respect to the pattern of the electric conductor 6 in the X direction, the sum of the areas of the second linear portions 412, 422, 432 and 442 stay the same.

Accordingly, even when the pattern of the strain gauge 3, the resistor element connector 4 and the electrode 5 is misaligned with respect to the pattern of the electric conductor 6 in the Y direction or in the X direction, the sum of the areas of the regions 51 to S4 stay the same.

The first exemplary embodiment provides the following effects.

(1) The detector 20 provided on the flat portion of the diaphragm 10 includes the plurality of strain gauges 3 for detecting a strain, the resistor element connectors 4 connecting adjacent ones of the strain gauges 3, and the electric conductors 6 covering a part of the resistor element connectors 4. The first linear portions 411, 421, 431, 441 and the second linear portions 412, 422, 432, 442 of the resistor element connectors 4 exposed from the electric conductor 6 are orthogonal to the edges 61A, 61B, 62A, 62B, 63A, 63B, 64A, 64B of the electric conductor 6 extending across the first linear portions 411, 421, 431, 441 and the second linear portions 412, 422, 432, 442. Accordingly, even when the pattern of the strain gauge 3 and the resistor element connector 4 and the pattern of the electric conductor 6 are misaligned in the X or Y direction, the areas of the parts of the resistor element connector 4 exposed from the electric conductor 6 do not change. Accordingly, since the resistances in the plurality of the strain gauges 3 do not change, the detection accuracy can be improved.

(2) The resistor element connectors 4 each are connected to both ends of the strain gauges 3. Further, the edges 61A, 62A, 63A, 64A of the electric conductor 6 extending across the first linear portions 411, 421, 431, 441 of the resistor element connectors 4 are in parallel with each other and the edges 61B, 62B, 63B, 64B of the electric conductor 6 extending across the second linear portions 412, 422, 432, 442 are in parallel with each other. Accordingly, even when the patterns of the first linear portions 411, 421, 431, 441 and the second linear portions 412, 422, 432, 442 are parallelly misaligned with respect to the pattern of the electric conductor 6 in forming the electric conductor 6, the areas of the strain gauge 3 and the resistor element connector 4 do not change. Accordingly, the resistance in the plurality of strain gauges 3 stays the same and the variation in the output of the strain gauges 3 can be restrained, thereby facilitating the output adjustment.

(3) The strain gauge 3 are provided by the two central strain gauges 31, 32 disposed at the center of the diaphragm 10 and the two outer strain gauges 33, 34 disposed at the outer side of the diaphragm 10. The first resistor element connector 41 and the fourth resistor element connector 44 are connected to the central strain gauge 31. The second resistor element connector 42 and the third resistor element connector 43 are connected to the central strain gauge 32. The first linear portions 411, 421, 431, 441 of the resistor element connectors 41 to 44 are in parallel with the edges 61A, 62A, 63A, 64A of the electric conductor 6 extending across the first linear portions 411, 421, 431, 441. Accordingly, since the resistances of the two central strain gauges 31, 32 do not change, the variation in the output of the plurality of strain gauges 3 can also be reduced thereby.

(4) Since the strain gauge 3, the resistor element connector 4 and the electrode 5 are made of the same material, these components can be formed on the diaphragm 10 in the same process, so that the sensor module 1 can be easily produced.

(5) Since the diaphragm 10 is provided at an end of a cylindrical portion 10A and the recess, into which a to-be-measured fluid is introduced, is provided inside the cylindrical portion 10A, the above effects can be achieved in a pressure sensor device.

(6) The ratio (ta/t) of the width ta of the ends 41A, 42A, 43A, 44A of the resistor element connector 4 relative to the width t of the central strain gauges 31, 32 is less than 5. The ratio (tb/t) of the width tb of the second linear portions 412, 422, 432, 442 relative to the width t of the outer strain gauges 33, 34 is less than 5. Accordingly, the width of the strain gauge 3 as well as the width of the linear portion of the resistor element connector 4 can be reduced to reduce the area of the detector 20 as a whole, thereby downsizing the sensor module 1.

(7) Since the protection film is provided on the detector 20, the detector 20 is kept from being exposed to cause any trouble.

Second Exemplary Embodiment

Next, the second exemplary embodiment of the invention will be described below with reference to FIGS. 4 to 5C.

The arrangement of the second exemplary embodiment is the same as that of the first exemplary embodiment except for the shape of the detector in a plan view. In the description of the second exemplary embodiment, the same numeral will be attached to the same components as those in the first exemplary embodiment to omit or simplify the description thereof.

Figure 4:
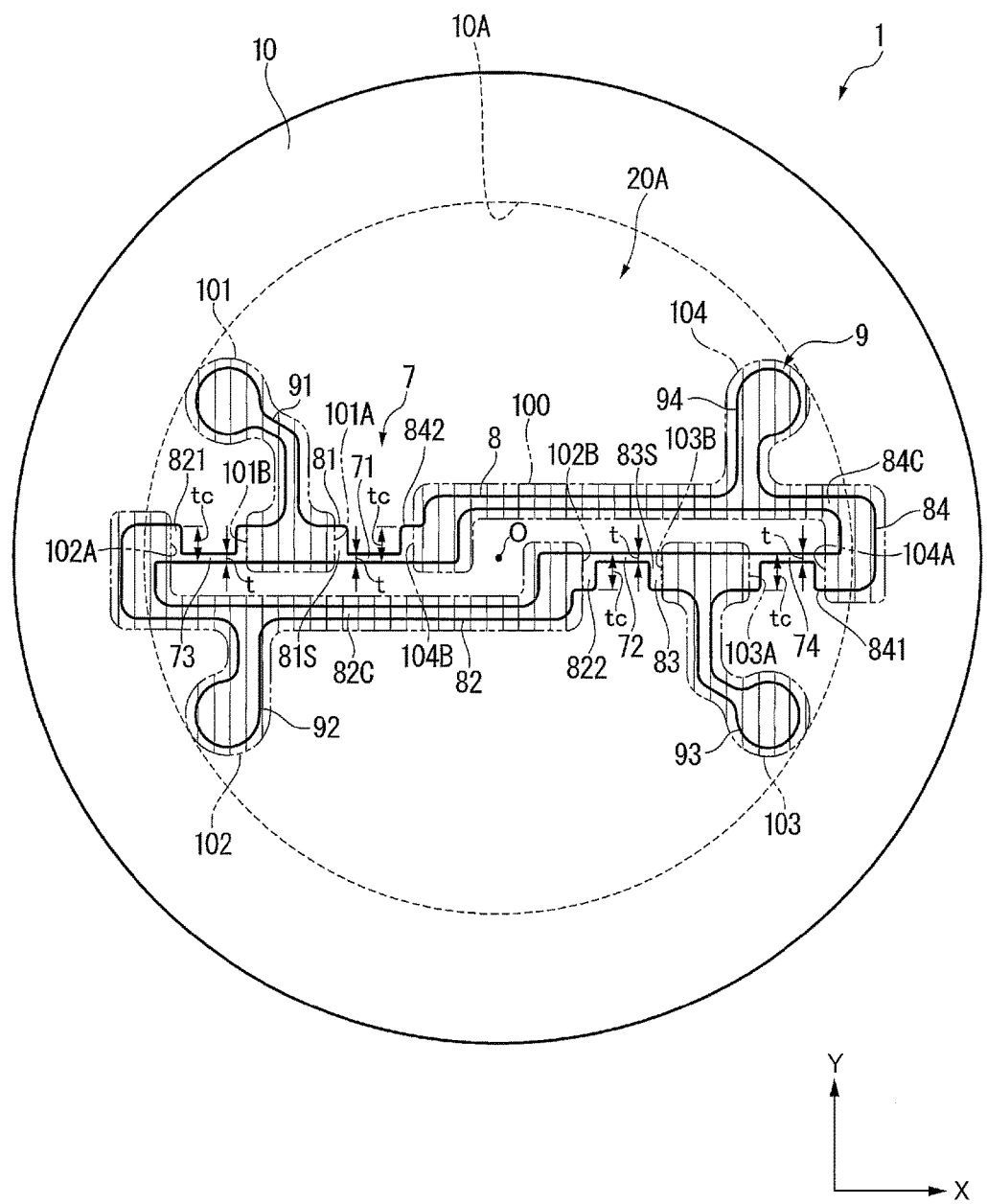
FIG. 4 is a plan view showing a sensor module according to a second exemplary embodiment of the invention.

FIG. 4 is a plan view showing a sensor module according to a second exemplary embodiment.

As shown in FIG. 4, a sensor module 2 includes the diaphragm 10, and a detector 20A provided on the flat portion of the diaphragm 10.

The detector 20A includes four strain gauges 7 for detecting a strain, the resistor element connector 8 connected with the strain gauges 7, the electrode 9 connected with the resistor element connector 8, and the electric conductor 100 covering a part of the resistor element connector 8 and the electrode 9.

The strain gauge 7, the resistor element connector 8 and the electrode 9 are made of the same material (e.g. polysilicon).

The strain gauge 7 includes two central strain gauges 71, 72 disposed at the center of the diaphragm 10, and two outer strain gauges 73, 74 disposed at the outer side of the diaphragm 10.

The two central strain gauges 71, 72 are linearly formed in parallel with each other in the X direction in FIG. 4.

The two central strain gauges 71, 72 are offset in a direction away from each other in X direction across the circle center O of the diaphragm 10.

The outer strain gauge 73 is linearly formed and collinear with the central strain gauge 71.

The outer strain gauge 74 is linearly formed and collinear with the central strain gauge 72.

The widths of the central strain gauges 71, 72 and the outer strain gauges 73, 74 are t.

The resistor element connector 8 includes a first resistor element connector 81, a second resistor element connector 82, a third resistor element connector 83 and a fourth resistor element connector 84.

The first resistor element connector 81 includes a linear portion 81 S connected with a first end of the central strain gauge 71. A second end of the linear portion 81S is connected with a first end of the outer strain gauge 73. The linear portion 81S is in parallel with the strain gauge 7. The dimension (i.e. the width) of the linear portion 81S along the Y direction is tc.

The second resistor element connector 82 includes a first linear portion 821 having a first end connected with a second end of the outer strain gauge 73, a U-shaped (in a plan view) connection 82C having a first end connected with a second end of the first linear portion 821, and a second linear portion 822 having a first end connected with a second end of the connection 82C. A second end of the second linear portion 822 is connected with a first end of the central strain gauge 72. The first linear portion 821 and the second linear portion 822 extend in the longitudinal direction of the central strain gauge 71 (i.e. X direction) and are parallel with each other. The widths of the first linear portion 821 and the second linear portion 822 are each tc.

The third resistor element connector 83 includes a linear portion 83S having a first end connected with a second end of the central strain gauge 72. A second end of the linear portion 83S is connected to a first end of the outer strain gauge 74. The linear portion 83S is in parallel with the strain gauge 7. The dimension (i.e. the width) of the linear portion 83S along the Y direction is tc.

The fourth resistor element connector 84 includes a first linear portion 841 having a first end connected with a second end of the outer strain gauge 74, a U-shaped (in a plan view) connection 84C having a first end connected with a second end of the first linear portion 841, and a second linear portion 842 having a first end connected with a second end of the connection 84C. A second end of the second linear portion 842 is connected with a second end of the central strain gauge 71. The first linear portion 841 and the second linear portion 842 extend in the longitudinal direction of the central strain gauge 71 and are parallel with each other. The widths of the first linear portion 841 and the second linear portion 842 are each tc.

The electrode 9 includes a first electrode 91, a second electrode 92, a third electrode 93 and a fourth electrode 94.

The first electrode 91 has a first end connected with the linear portion 81S. A circular space for defining a pad is formed at a second end of the first electrode 91.

The second electrode 92 has a first end connected with the connection 82C. A circular space for defining a pad is formed at a second end of the second electrode 92.

The third electrode 93 has a first end connected with the linear portion 83S. A circular space for defining a pad is formed at a second end of the third electrode 93.

The fourth electrode 94 has a first end connected with the connection 84C. A circular space for defining a pad is formed at a second end of the fourth electrode 94.

The electric conductor 100 is made of a conductive material such as gold. The electric conductor 100 includes a first electric conductor 101, a second electric conductor 102, a third electric conductor 103 and a fourth electric conductor 104.

The first electric conductor 101 covers a part of the linear portion 81S and the first electrode 91.

The second electric conductor 102 covers a part of the first linear portion 821, a part of the second linear portion 822, the connection 82C and the second electrode 92.

The third electric conductor 103 covers a part of the linear portion 83S and the third electrode 93.

The fourth electric conductor 104 covers a part of the first linear portion 841, a part of the second linear portion 842, the connection 84C and the fourth electrode 94.

It should be noted that a plurality of vertical lines are shown in the electric conductor 100 in FIG. 4 to highlight the region of the electric conductor 100.

In the second exemplary embodiment, a ratio (tc/t) of the width tc of the linear portions 81S, 83S, the first linear portions 821, 841 and the second linear portions 822, 842 relative to the width t of the central strain gauges 71, 72 is less than 5.

Specifically, with the diameter of the diaphragm 10 being 5 mm, when the width t of the central strain gauges 71, 72 is 40 μm and the width tc of the linear portions 81S, 83S, the first linear portions 821, 841 and the second linear portions 822, 842 is 120 μm, tc/t=3.

Both ends of the linear portion 81S of the first resistor element connector 81 are exposed from the first electric conductor 101 so that the exposed part extending in the X direction is orthogonal to edges 101A, 101B of the first electric conductor 101 extending across the linear portion 81S.

Both ends of the linear portion 83S of the third resistor element connector 83 is exposed from the third electric conductor 103 so that the exposed part extending in the X direction is orthogonal to edges 103A, 103B of the third electric conductor 103 extending across the linear portion 83S.

The first linear portion 821 of the second resistor element connector 82 is exposed from the second electric conductor 102 so that the exposed part of the first linear portion 821 extending in the X direction is orthogonal to an edge 102A extending across the first linear portion 821.

The second linear portion 822 of the second resistor element connector 82 is exposed from the second electric conductor 102 so that the exposed part of the second linear portion 822 extending in the X direction is orthogonal to an edge 102B of the second electric conductor 102 extending across the second linear portion 822.

The first linear portion 841 of the fourth resistor element connector 84 is exposed from the fourth electric conductor 104 so that the exposed part of the first linear portion 841 extending in the X direction is orthogonal to an edge 104A extending across the first linear portion 841.

The second linear portion 842 of the fourth resistor element connector 84 is exposed from the fourth electric conductor 104 so that the exposed part of the second linear portion 842 extending in the X direction is orthogonal to an edge 104B extending across the second linear portion 842.

Next, a method for producing the sensor module according to the second exemplary embodiment will be described with reference to FIGS. 5A to 5C.

Figure 5A:
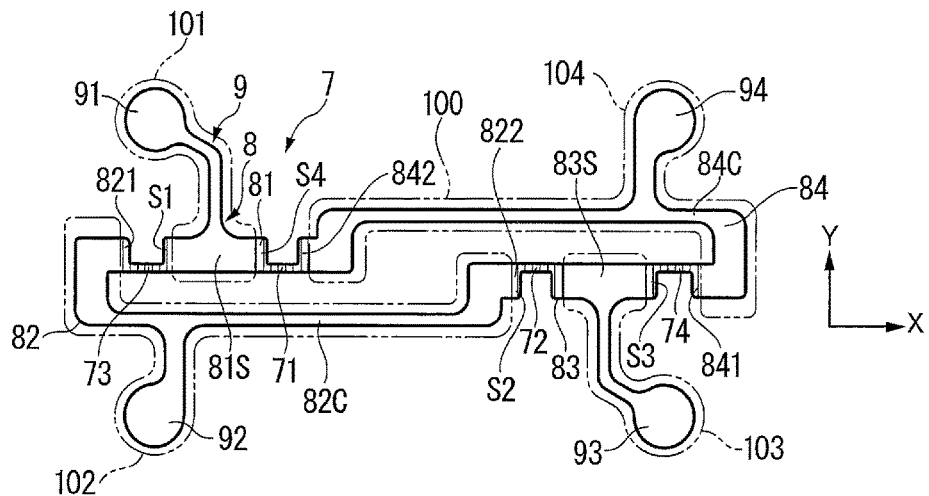
FIG. 5A is a schematic illustration showing a method for producing the sensor module according to the second exemplary embodiment.

As shown in FIG. 5A, the pattern of the strain gauge 7, the resistor element connector 8 and the electrode 9 is formed on the diaphragm using vapor-deposit and the like. Subsequently, as shown by imaginary lines, a part of the linear portions 81S, 83S of the resistor element connector 8, a part of the first linear portions 821, 841, a part of the second linear portions 822, 842, the connections 82C, 84C, the first electrode 91, the second electrode 92, the third electrode 93 and the fourth electrode 94 are covered with the electric conductor 100. The electric conductor 100 is formed by a vapor-deposit of a conductive material on the strain gauge 7, the resistor element connector 8 and the electrode 9. The vapor-deposit is performed on the diaphragm along the X direction or the Y direction. A protection layer is formed on the thus provided detector 20A. It should be noted that FIG. 5A shows the electric conductor 100 is provided at originally intended (correct) position.

Among the exposed regions of the strain gauge 7, the resistor element connector 8 and the electrode 9, a region exposed between the first electric conductor 101 and the second electric conductor 102 is defined as 51, a region exposed between the second electric conductor 102 and the third electric conductor 103 is defined as S2, a region exposed between the third electric conductor 103 and the fourth electric conductor 104 is defined as S3, and a region exposed between the fourth electric conductor 104 and the first electric conductor 101 is defined as S4.

Figure 5B:
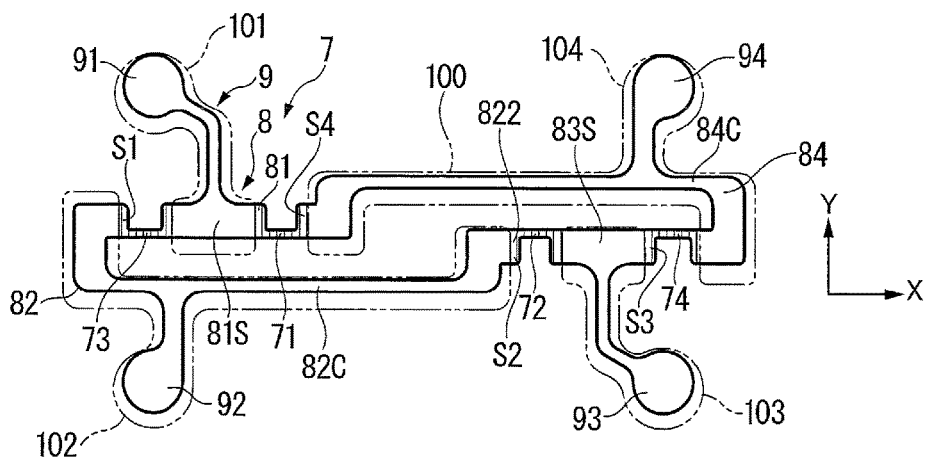
FIG. 5B is another schematic illustration showing the method for producing the sensor module according to the second exemplary embodiment.
Figure 5C:
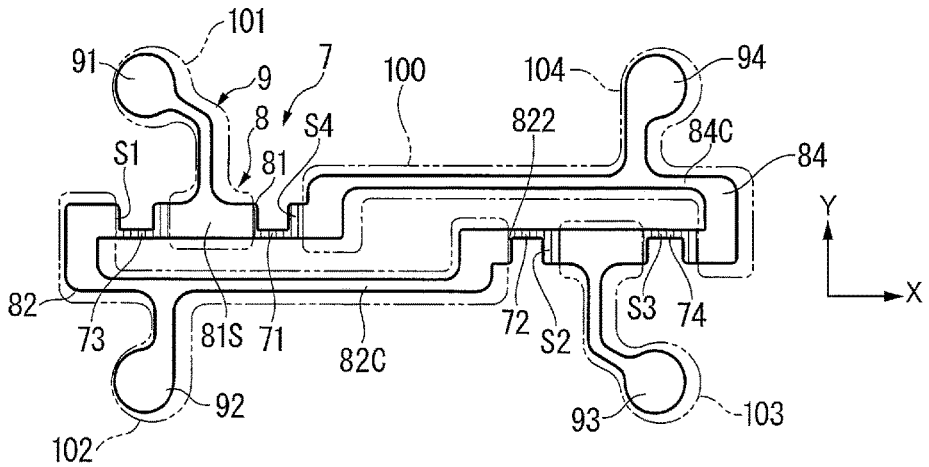
FIG. 5C is still another schematic illustration showing the method for producing the sensor module according to the second exemplary embodiment.

When the electric conductor 100 is formed, the pattern of the strain gauge 7, the resistor element connector 8 and the electrode 9 may sometimes be misaligned with the pattern of the electric conductor 100 in the Y direction (as shown in FIG. 5B) or in X direction (as shown in FIG. 5C).

In the second exemplary embodiment, as in the first exemplary embodiment, even when the pattern of the strain gauge 7, the resistor element connector 8 and the electrode 9 is misaligned with respect to the pattern of the electric conductor 100 in the Y direction or in X direction, the sum of the areas stays the same.

Accordingly, the second exemplary embodiment provides the same effects (1) to (7) as mentioned with regard to the first exemplary embodiment.

Third Exemplary Embodiment

Next, the third exemplary embodiment of the invention will be described below with reference to FIG. 6.

The arrangement of the third exemplary embodiment is the same as that of the first exemplary embodiment except for the shape of the central strain gauge in a plan view. In the description of the third exemplary embodiment, the same numeral will be attached to the same components as those in the first exemplary embodiment to omit or simplify the description thereof.

Figure 6:
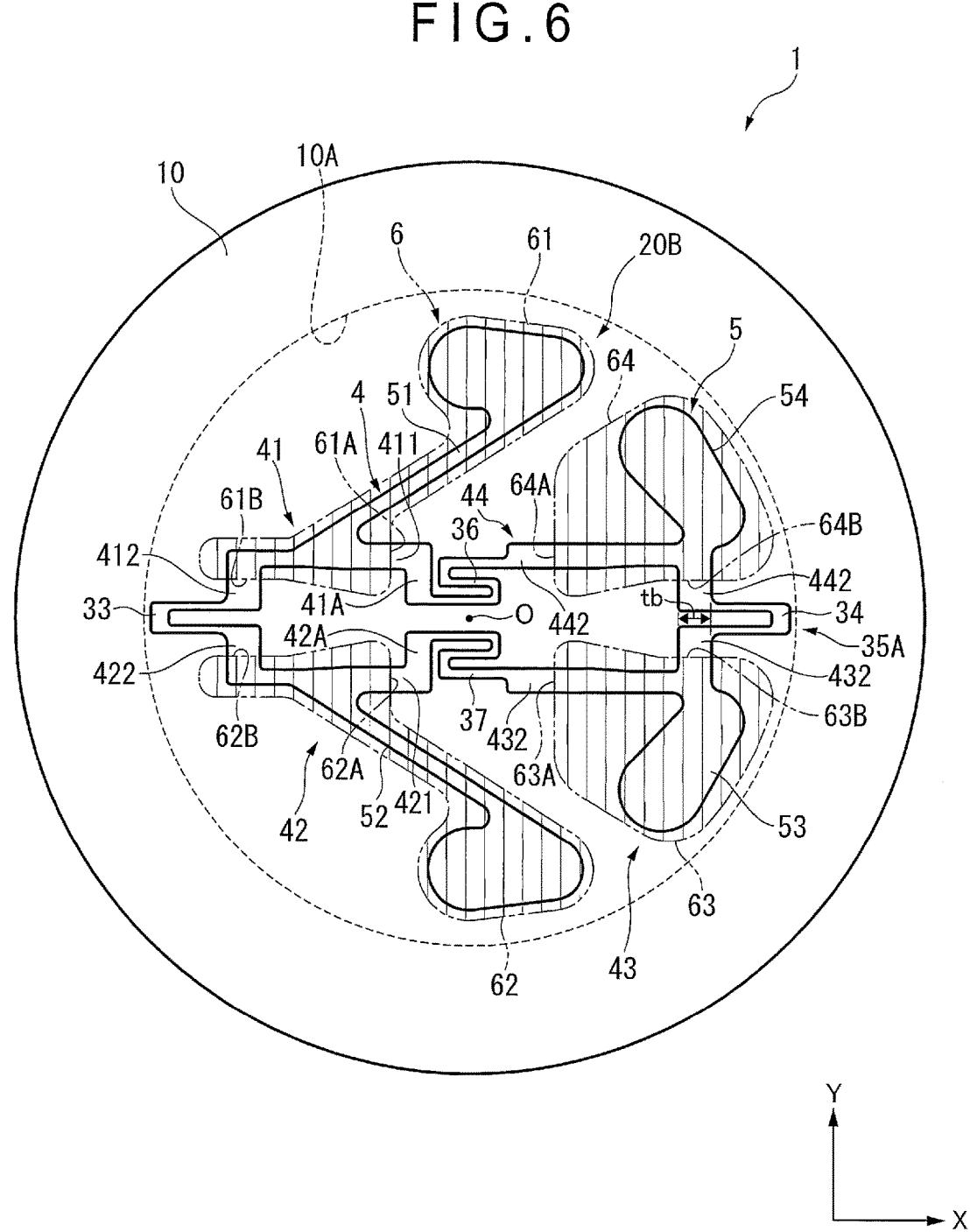
FIG. 6 is a plan view showing a sensor module according to a third exemplary embodiment of the invention.

FIG. 6 is a plan view showing a sensor module according to the third exemplary embodiment.

As shown in FIG. 6, a detector 20B of the third exemplary embodiment includes a strain gauge 35A.

The strain gauge 35A, the resistor element connector 4 and the electrode 5 are made of the same material (e.g. polysilicon).

The strain gauge 35A includes two central strain gauges 36, 37 disposed at the center of the diaphragm 10, and two outer strain gauges 33, 34 disposed at the outer side of the diaphragm 10.

The two central strain gauges 36, 37 are provided in an S-shape in a plan view. First ends of the central strain gauges 36, 37 are respectively connected to the ends 41A, 42A, and second ends of the central strain gauges 36, 37 are respectively connected to the second linear portions 432, 442.

The two central strain gauges 36, 37 are mutually closely disposed in parallel across the circle center O of the diaphragm 10.

The method for producing the sensor module 2 in the third exemplary embodiment is the same as that in the first exemplary embodiment.

The third exemplary embodiment provides the same effects (1) to (7) as mentioned with regard to the first exemplary embodiment.

Fourth Exemplary Embodiment

Next, a fourth exemplary embodiment of the invention will be described below with reference to FIG. 7.

The arrangement of the fourth exemplary embodiment is the same as that of the first exemplary embodiment except for the shape of the outer strain gauge, the resistor element connector and the electrode in a plan view. In the description of the fourth exemplary embodiment, the same numeral will be attached to the same components as those in the first exemplary embodiment to omit or simplify the description thereof FIG. 7 is a plan view showing a sensor module according to the fourth exemplary embodiment.

Figure 7:
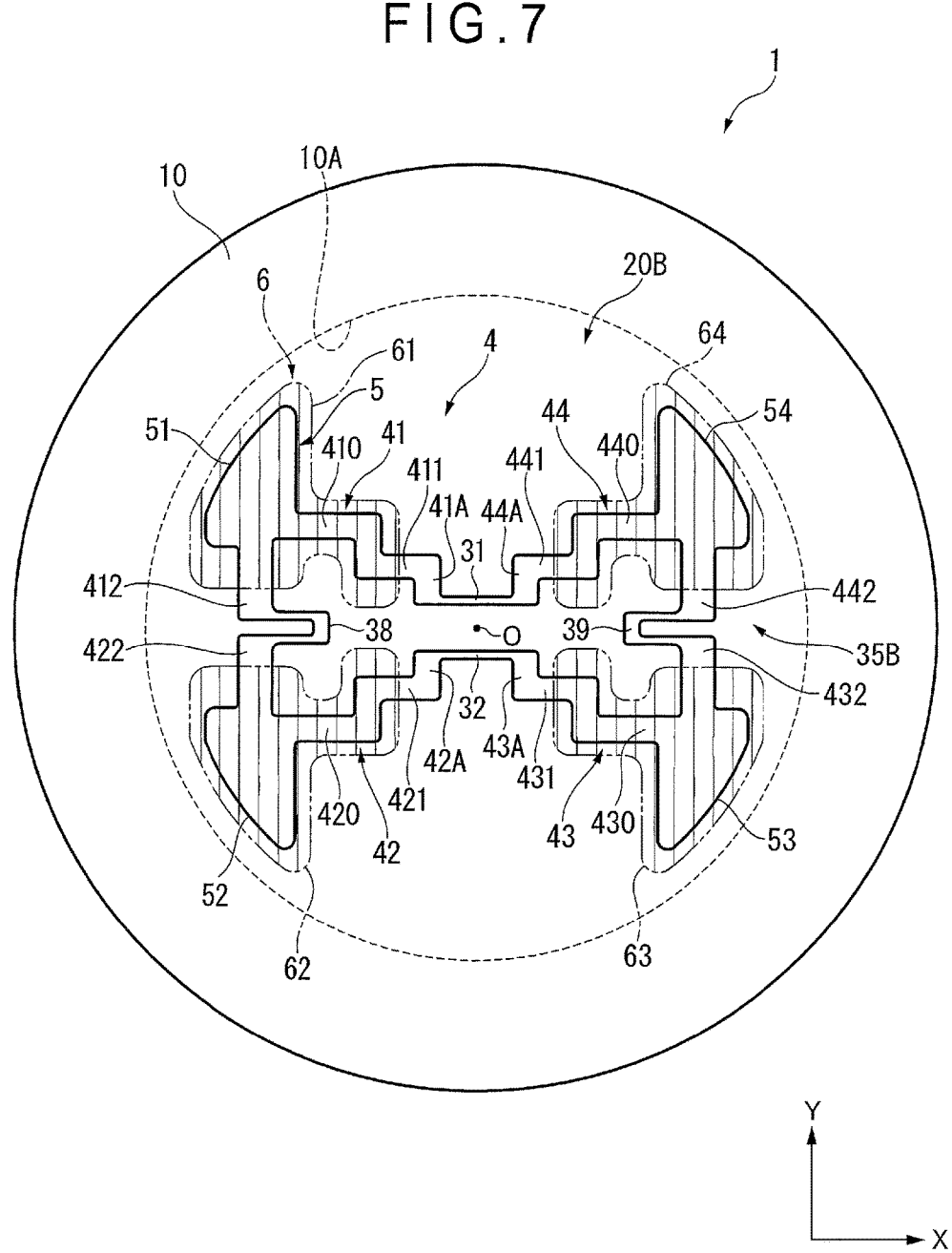
FIG. 7 is a plan view showing a sensor module according to a fourth exemplary embodiment of the invention.
Figure 8A:
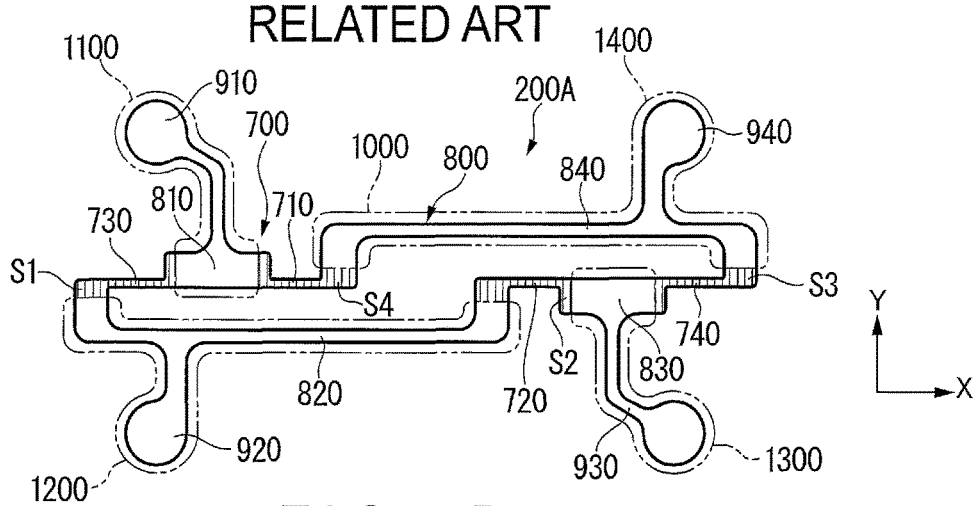
FIG. 8A is an illustration schematically showing a problem associated with a typical example.
Figure 8B:
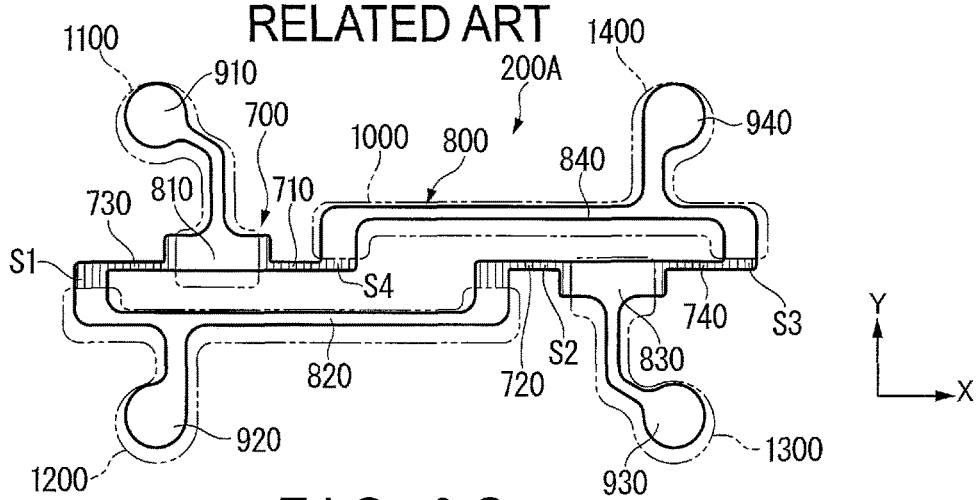
FIG. 8B is another illustration schematically showing the problem associated with the typical example.
Figure 8C:
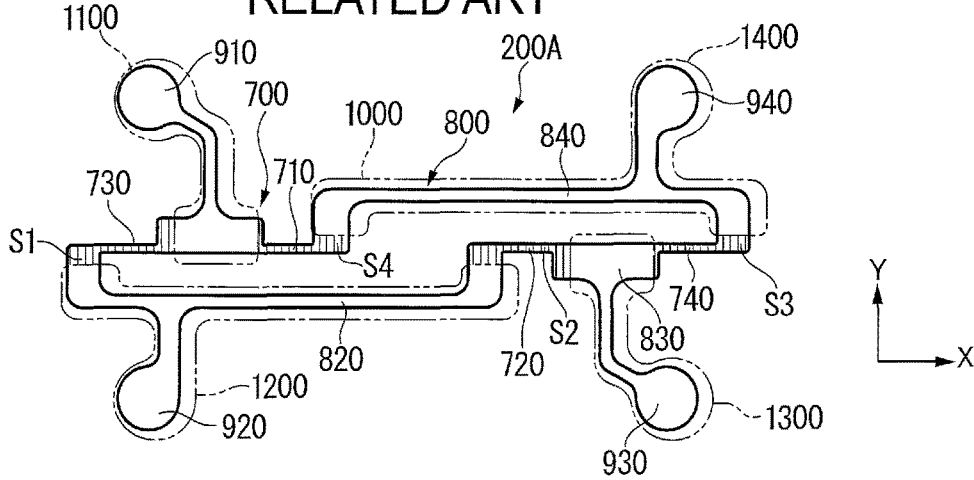
FIG. 8C is still another illustration schematically showing the problem associated with the typical example.

As shown in FIG. 7, the detector 20B of the fourth exemplary embodiment includes the strain gauge 35B, the resistor element connector 4 and the electrode 5.

The strain gauge 35B, the resistor element connector 4 and the electrode 5 are made of the same material (e.g. polysilicon).

The strain gauge 35B includes two central strain gauges 31, 32 disposed at the center of the diaphragm 10, and two outer strain gauges 38, 39 disposed at the outer side of the diaphragm 10.

The two outer strain gauges 38, 39 are formed to have an outwardly opened C-shape in a plan view and each have ends connected to the second linear portions 412, 422, 432, 442.

The first resistor element connector 41 includes an L-shaped (in a plan view) connector section 410 connecting the first linear portion 411 and the second linear portion 412 as well as the end 41A, the first linear portion 411 and the second linear portion 412.

The first electrode 51 is connected at a connection of the connector section 410 and the second linear portion 412.

The second resistor element connector 42 includes an L-shaped (in a plan view) connector section 420 connecting the first linear portion 421 and the second linear portion 422 as well as the end 42A, the first linear portion 421 and the second linear portion 422.

The second electrode 52 is connected at a connection of the connector section 420 and the second linear portion 422.

The third resistor element connector 43 includes an L-shaped (in a plan view) connector section 430 connecting the first linear portion 431 and the second linear portion 432 as well as the end 43A, the first linear portion 431 and the second linear portion 432.

The third electrode 53 is connected at a connection of the connector section 430 and the second linear portion 432.

The fourth resistor element connector 44 includes an L-shaped (in a plan view) connector section 440 connecting the first linear portion 441 and the second linear portion 442 as well as the end 44A, the first linear portion 441 and the second linear portion 442.

The fourth electrode 54 is connected at a connection of the connector section 440 and the second linear portion 442.

The method for producing the sensor module 1 in the fourth exemplary embodiment is the same as that in the first exemplary embodiment.

The fourth exemplary embodiment provides the same effects (1) to (7) as mentioned with regard to the first exemplary embodiment.

Incidentally, it should be understood that the scope of the present invention is not limited to the above-described exemplary embodiment(s) but includes modifications and improvements as long as the modifications and improvements are compatible with the invention.

For instance, though the strain gauges 3, 7, 35A, 35B, the resistor element connectors 4, 8 and the electrodes 5, 9 are made of the same material, these elements may be made of different materials.

Though the widths of the ends 41A, 42A, 43A, 44A are the same (ta) in the above exemplary embodiments, the widths may be different in the invention. Similarly, though the widths of the second linear portions 412, 422, 432, 442 are the same (tb) in the above exemplary embodiments, the widths may be different in the invention.

Though the sensor module 1 is described as a pressure sensor device for detecting the pressure of the to-be-measured fluid in the above exemplary embodiments, the sensor module 1 may be a physical quantity measurement sensor for detecting, for instance, temperature.

What is claimed is:

1. A sensor module comprising:
   a diaphragm; and
   a detector provided to a flat portion of the diaphragm to detect a pressure, wherein,
   the detector comprises a plurality of strain gauges each configured to detect a strain, resistor element connectors connecting adjacent ones of the strain gauges, and an electric conductor covering a part of the resistor element connectors,
   the resistor element connectors each comprise a linear portion connecting respective pairs of the strain gauges, a part of the linear portion being exposed from the electric conductor,
   the linear portions connected to either end of each of the strain gauges extend in a direction away from each other with respect to the strain gauges, and
   the linear portions of the resistor element connectors extend in a first direction orthogonal to a linear edge of the electric conductor extending across the linear portion.

2. The sensor module according to claim 1, wherein the resistor element connectors comprise at least a first resistor element connector and a second resistor element connector, the first and second resistor element connectors being respectively connected to each of ends of the strain gauges, and
   the edge of the electric conductor extending across the linear portion of the first resistor element connector exposed from the electric conductor is in parallel with the edge of the electric conductor extending across the linear portion of the second resistor element connector exposed from the electric conductor.

3. The sensor module according to claim 1, wherein the strain gauges comprise at least two central strain gauges disposed at a center of the diaphragm and at least two outer strain gauges disposed at an outer side of the diaphragm,
   the resistor element connectors comprise at least two resistor element connectors each connected to each of ends of the central strain gauges, and
   the linear portions of the resistor element connectors are mutually in parallel and the edges of the electric conductor each extending across the linear portions of each of the resistor element connectors are mutually in parallel.

4. The sensor module according to claim 1, wherein the strain gauges and the resistor element connectors are made of the same material.

5. The sensor module according to claim 1, wherein the diaphragm is provided at an end of a cylindrical portion, and the cylindrical portion is configured to receive therein a to-be-measured fluid.

6. A method for producing the sensor module according to claim 1, the method comprising:
   forming a pattern of the strain gauges and the resistor element connectors on the diaphragm; and
   layering a conductive material on a part of the linear portion of the resistor element connectors to form the detector.

* * * * *